INVENTOR
WALTER THORMAHLEN
ATTORNEY.

United States Patent Office 3,488,306
Patented Jan. 6, 1970

3,488,306
POLYETHYLENE COPOLYMER OF ETHYLENE AND VINYL ACETATE-FATTY ACID OR FATTY ACID SALT COMPOSITIONS
Walter Thormahlen, Karlsruhe, Germany, assignor to Elbatainer Kunststoff- und Verpackungs GmbH & Co., Ettlingen, Baden, Germany, a corporation of Germany
Filed May 27, 1966, Ser. No. 553,542
Claims priority, application Germany, May 28, 1965, E 29,393
Int. Cl. C08f 37/18, 45/36
U.S. Cl. 260—23                               7 Claims

ABSTRACT OF THE DISCLOSURE

The present invention provides novel copolymers formed from (i) high-density polyethylene having a molecular weight in excess of 100,000, (ii) ethylene-vinylacetate copolymer containing 18% vinylacetate, the ratio of (i) to (ii) being between 1:1 and 1:9, and (iii) between 0.2% and 1% by weight of the total of the three components, of a carboxylic acid containing at least 16 carbon atoms and specified derivatives thereof. These novel copolymers are prepared by rigorously working the components thereof at a temperature of above about 160° C. and a pressure of about 400 atmospheres.

The present invention relates to improved ethylene copolymers.

Polyethylene has the advantage of being useful in a form without the necessity of compounding with plasticizers. They are also non-toxic; they have good resistance to attach by chemicals; and are readily processed. However, polyethylenes have had disadvantages in that the high pressure polyethylenes having a density of between about 0.917 and 0.940 are extremely susceptible to stress corrosion; they have poor flexing strength; poor resistance to alternative bending; and do not have sufficient shock resistance and shock elasticity; and in particular they do not have sufficient imperviousness to gases effecting their use as film material for packaging liquid materials. In contrast to the foregoing, the low pressure polyethylenes have higher imperviousness to gases; better impact and shock strength; higher resistance to attack by chemicals; better ageing properties; and less tendency towards stress crack corrosion. However, their higher rigidity and greater susceptibility to cracking induced by flexing, and very low resistance to alternative bending, are generally disadvantageous. Attempts have been made by mixing high pressure and low pressure polyethylenes to exert a favorable influence, in particular on the stiffness of the product so as to be able to utilize this mixture for specific purposes. However, such mixtures of branched high pressure polyethylene, with linear low pressure polyethylene, are of a heterogenous nature. In such mixtures, certain of the properties of the individual components are slightly degraded, while the remaining properties are strongly degraded. In particular, they lack resistance to stress corrosion, flexing strength, heat-seal strength, etc. The use of such heterogenous mixtures is therefore severely limited and in most cases are restricted to specific uses.

It is known that copolymers of ethylene-ethylacrylate, ethylene-vinylacetate, and ethylene-methylacrylate, have particularly high shock resistance, high shock elasticity, excellent elasticity in general, and excellent mechanical properties in the wide temperature range of −60° C. to +60° C., high resistance to stress corrosion, and long life in flexing. Such materials also do not require plasticizers. The use of these copolymers however, has been greatly reduced, and is frequently impossible, particularly in the field of packaging, due to their mobility and poor dimensional stability, their low imperviousness to gases, the tackiness exhibited by their surface, and the tendency toward blocking. Attempts have been made to eliminate the mobility and blocking properties inherent in these materials, by mixing high-pressure polyethylene therewith. However, such properties as the resistance to stress corrosion, shock strength and shock elasticity, are greatly reduced in such mixtures. From the foregoing, it is apparent that there exists a need for ethylene copolymers having properties which are superior to those in known polymers.

It is an object of the present invention to provide novel ethylene copolymers.

It is also an object of this invention to provide a method for producing ethylene copolymers having superior properties.

The present invention provides novel polyethylene compositions prepared from three components, A, B, and C, in which: component A is a copolymer of ethylene-vinylacetate, ethylene-ethylacrylate, or ethylene-methylacrylate; component B is a low pressure polyethylene, preferably one having a molecular weight in excess of 100,000 and the lowest possible viscosity; and component C is a fatty acid having 16 or more carbon atoms. The product contains component A and component B in a ratio between 1:1 and 1:9, and component C in an amount between 0.2% and 1% by weight of the total product composition. The product composition is prepared by vigorously mixing the three components preferably under high pressure, e.g., up to about 400 atmospheres gauge pressure. The preferred mixing apparatus is a combination mixer and extruder operating at a pressure of about 400 atmospheres. This high pressure mixing results in the activation of the residues of further distant polymers (uncombined) still present in the starting components A and B, and the individual components are combined into a homogeneous material, namely an ethylene copolymer.

The component C, which has proven particularly advantageous, is selected from saturated fatty acids having 16 or more carbon atoms, such as a palmitic, stearic, arachic, behenic acids, etc., as well as the unsaturated acids, such as oleic acid, ricinoleic acid, hydroxystearate, 12-hydroxystearic acid, etc. These fatty acids when admixed with components A and B in a melt, form a clear solution. They form a true compound (copolymer) with them and are therefore, quasi bridge-formers or emulsifiers and as such effect the production of a homogeneous composition.

As a result of the high decomposition temperatures of fatty acids utilized, i.e., in excess of 350° C., the resultant compounds are extremely stable at high temperatures and to mechanical stress. As a consequence, the compositions may be severely worked during processing. It is possible to utilize greater proportions of reprocessed material than with other known materials without prior reconstitution. In addition, the compositions have surprisingly high resistance to stress corrosion. In contrast to the use of the specified fatty acids in such compositions, metal salts of fatty acids such as the magnesium, zinc, calcium, and other stearates tend to readily bloom or effervesce upon reprocessing, resulting in reduced heat sealability, increased internal stresses, etc. 12-hydroxystearates are superior in this respect to the latter.

The copolymers of this invention may utilize a wide ratio of the proportions of component A (the ethylene-copolymer) and of component B (the low pressure linear polyethylene). The ratio of these components may be varied depending upon the properties desired, the use of the copolymer, and the processing method. The proportion of component C (the fatty acids) may also be increased if necessary, dependant upon the method of processing, the proposed use, and the stabilizers, lubricants, and other well known additives such as fillers, colorants, antispatic agents, etc., utilized. The components of the copolymer should be uniformly and intensively premixed before further compounding to obtain optimum values.

The copolymers obtained by the aforedescribed methods have surprisingly superior properties than do the individual components thereof, or than can be accounted for merely as a result of the cumulative addition of properties based upon the individual properties of the components. These include:

(1) A shock strength, a value important in relation to mechanical stress, about 50% higher than the value that would be accounted for resulting merely from the mixed components.

(2) Higher shock elasticity than that of the individual components.

(3) The resistance to tearing, also the resistance to propagation of tearing, and also the resistance to penetration is far higher than that in the three components.

(4) The resistance to stress corrosion, an important property, is more than 6,000 hours in the Bell test; a result far superior to all comparable plastics.

(5) The heat-seal strength of films and other articles produced from these copolymers is considerably better than that exhibited by a pure binary mixture of components A and B. Other desirable properties normally associated with low pressure polyethylene, and the polyethylene copolymer (component A) are cumulative in the composition of this invention, in accordance with the percentages of the prospective material therein. These include the elasticity, dimensional stability under load, flexing strength, chemical stability, permeability to gases, non-toxic nature of the materials, and good stability to temperature change from −60° C. to +60° C.

The invention is further illustrated in the following examples:

EXAMPLE 1

70 parts of ethylene-vinylacetate copolymer granules containing 18% vinylacetate, and 30 parts low-pressure, low-viscosity, polyethylene granules having a density of 0.940 are mixed for 60 seconds with a speed of rotation of 1000 r.p.m. at a pot temperature of 60° C., whereby the granules are heated and a surface tackiness obtained. Fatty acid (0.3%) is now added, of the formula $C_{22}H_{44}O_2$ or of the formula $C_{18}H_{34}O_2$, or similar compounds, or their derivatives, sintered for an additional 60 seconds. This mixture was compounded on a Krauss-Faffei mixtruder with an energy input of 0.30 kw.hr./kg., with an entrance heating temperature of 160° C. and an outlet nozzle temperature of 200° C., over a gap width of 1.5 mm. under a pressure of about 400 atmospheres absolute, with a screw speed of 100 r.p.m., and thereupon granulated and then worked into sheets, shaped bodies or similar products.

EXAMPLE 2

60 parts of ethylene-vinylacetate copolymer containing 18% vinylacetate, and 40 parts of low-pressure polyethylene of low viscosity and a density of 0.940, are premixed in a Henschel fluid mixer with a speed of rotation of 1000 r.p.m., at a pot temperature of 60° C., for 30 seconds. Then 0.2% of a liquid fatty acid containing about 25% solids was added over a period of 30 seconds, so as to obtain a good wetting of the surface of the granules. Thereafter, 0.3% powdered ricinoleic acid, 0.15% 12-hydroxy-Zn-stearate, 0.15% 12-hydroxy-Ca-stearate, 0.25% of a commercial stabilizer, and 0.005% dyestuff were added to the premix, and mixing continued for an additional 60 seconds. The powdered components were uniformly wetted. This mixture is then compounded on a Krauss-Maffei mixtruder under the same conditions as indicated in Example 1, but with an energy supply of 0.325 kw.hr./kg., then granulated and then processed further.

It should be noted that the apparatus conditions are maintained in such a manner that polymer chains are not broken and degradation is avoided. The melt index obtained for the compounded material should not substantially exceed the additive average value of the copolymer (component A) and the low-pressure high density (above 0.940) polyethylene. By increasing the melt index, it is possible, it is true, to obtain a substantial increase in the shock strength and elasticity which may at times be desirable, but the resistance to stress corrosion is thereby decreased.

In the following table are set forth in comparative fashion, (1) physical properties of commercial plastics of the ethylene series; (2) known mixtures of components A and B, and for the copolymers of the present invention. The values for the copolymers of this invention were obtained using materials in which the fatty acid was $C_{18}H_{34}O_2$, and also for materials in which the fatty acid was $C_{22}H_{44}O_2$. The fatty acids or their derivations, component C, are usually added to the other components dry, or dissolved in a suitable solvent for fatty acids, e.g. a liquid hydrocarbon. The preferred fatty acids and their derivatives are those having 16 to 26 carbon atoms, their hydroxy-substituted derivations, and their cadmium, zinc, lead, tin, barium, strontium, and calcium salts.

| | Shock resistance, kg. cm./cm.$^2$ | Shock elasticity, percent | Ball indentation, hardness $10^{11}$ | Stress crack corrosion, hours | Crystallinity, percent | Sea strength |
|---|---|---|---|---|---|---|
| Commercial Plastics: | | | | | | |
| Starting materials: | | | | | | |
| Ethylene-vinylacetate copolymer (A) | 1,800 | 300 | 199 | 100 | 25 | Excellent. |
| LD-polyethylene 0.940 of reduced viscosity (B) | 1,350 | 250 | 450 | 60 | 78 | Sufficient. |
| As comparison: High-pressure polyethylene D 0.918 | 670 | 190 | 160 | 3 | 56 | Good. |
| Known Mixes: | | | | | | |
| Compound of A+B without C: Copolymer and LD-polyethylene 70:30 | 1,600 | 250 | 200 | 20 | 41 | Sufficient. |
| As comparison: Copolymer and HD-polyethylene 70:30 | 1,500 | 200 | 200 | 20 | 33 | Good. |
| Compound of the Invention—Compounds of A+B+C: | | | | | | |
| 80:20+0.5% fatty-acid (C) | 1,950 | 300 | 199 | 6,000 | 36 | Excellent. |
| 70:30+0.5% fatty-acid (C) | 2,200 | 300 | 200 | 6,000 | 41 | Do. |
| 60:40+0.3% fatty-acid (C) | 2,200 | 300 | 225 | 6,000 | 47 | Do. |
| 70:30+0.5% stearate (C) | 2,200 | 300 | 200 | 4,000 | 41 | Poor. |
| 20:80+0.5 stearate (C) | 1,670 | 300 | 345 | 1,000 | 69 | Do. |

From the values in the table it can be seen that the compositions of the invention have considerably better properties than the individual components of the mixture. This is true, for instance, also of the resistance to heat, tear strength, penetration resistance, etc. which are not set forth in the table, but which increase in a corresponding manner to the properties specified.

The accompanying drawings (FIGURES 1 to 4) obtained from mechanical recording in a Brabender Plastograph at a kneading temperature of 185° C., show the homogenization obtained in accordance with the invention of component A (ethylene-vinylacetate copolymer) plus component B (low-pressure polyethylene) plus component C (long-chain fatty acid and/or its derivatives) of the compound.

In the drawing, kneading time is plotted with respect to the resistance to mixing (kneading) (resistance to deformation).

Figure 1:
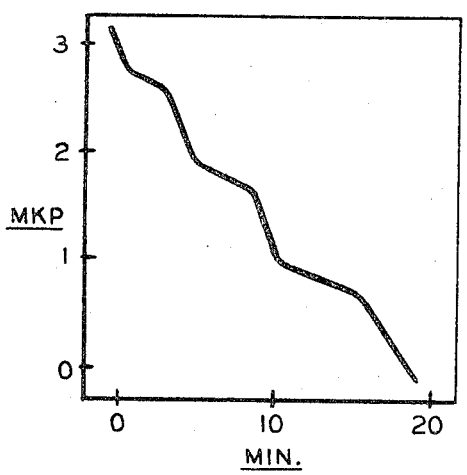
FIGURE 1 depicts the behavior of pure low-pressure polyethylene (component B) reflecting severe degradation phenomena with respect to time and mechanical load.
Figure 2:
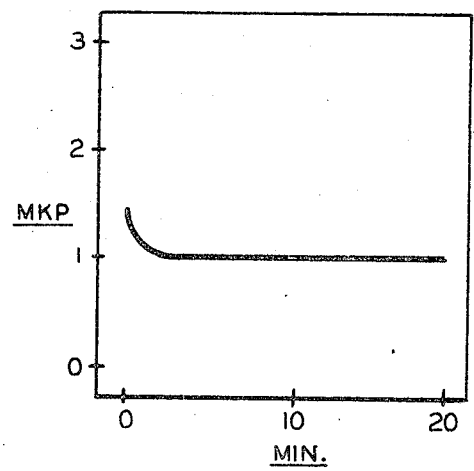
FIGURE 2 depicts the behavior of the pure ethylene-vinylacetate copolymer (component A) with good stability with respect to time, with constant kneading resistance.
Figure 3:
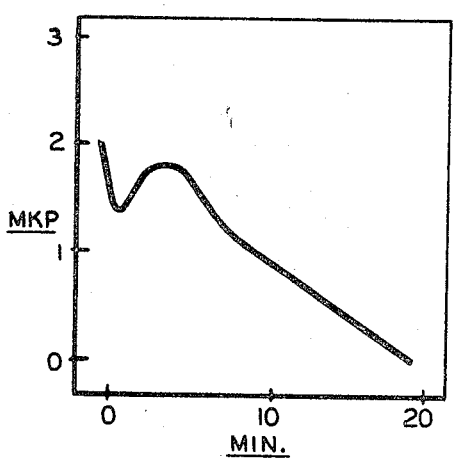
FIGURE 3 depicts the behavior of a plastic mixture of components A plus B (FIGURES 1 and 2) with a measure of degradation phenomenon, followed by brief cross-linking and subsquent decomposition.
Figure 4:
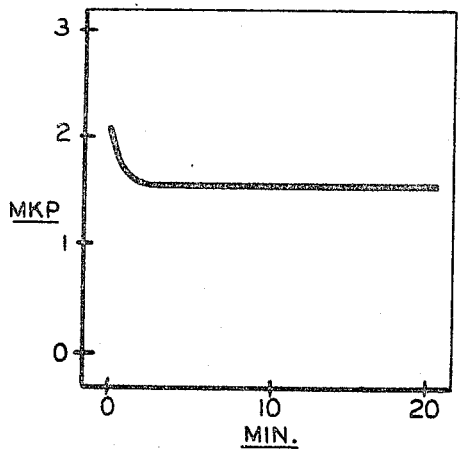
FIGURE 4 depicts, by way of comparison, the behavior of the homogeneous compositions of this invention, consisting of the components A plus B plus C, and illustrate their stable behavior with respect to time with constant increased kneading resistance.

As compared with the customary commercial high-pressure polyethylenes of a density of about 0.920, the components required for the composition of this invention are more expensive. These additional expenses for raw materials and the resultant processing costs are, however, outweighed by the savings in material possible in connection with the composition of the invention. The weights used, for instance in the case of hollow bodies, and the thicknesses, for instance in the case of sheets, can be reduced substantially, at least by ⅓, as compared with high-pressure polyethylene, as a result of the higher resistance to dropping, shock elasticity, tear strength and tear propagation strength, and as a result of the wide possibility for varying the degree of stiffness.

As a result of the possibility of variation inherent in the composition of the invention, they are suitable for production in the form of hollow bodies, sheets, injection moldings and compression moldings, coating compositions, sealing compositions, foams and many other useful forms.

While the invention has been described with particular reference to specific embodiments, it is to be understood that it is not limited thereto but is to be construed broadly and restricted solely by the scope of the appended claims.

I claim:

1. A homogeneous ethylene copolymer having excellent physical and stress corrosion properties consisting essentially of
   (i) an ethylene-vinylacetate copolymer containing 18% vinylacetate,
   (ii) low pressure high-density polyethylene having a molecular weight in excess of 100,000, in a ratio of (i) to (ii) of between 1:1 and 1:9, and reversed, and
   (iii) between 0.2% and 1% by weight of the three components of an acid component selected from the group consisting of the saturated and unsaturated carboxylic acids having at least 16 carbon atoms, the cadmium, zinc, lead, tin, barium, strontium, and calcium salts of said acids, and the saturated and unsaturated hydroxy carboxylic acids having at least 16 carbon atoms.

2. The copolymer, as set forth in claim 1, wherein said acid component contains between 16 and 26 carbon atoms.

3. The copolymer, as set forth in claim 2, wherein said acid component is selected from the group consisting of palmitic acid, stearic acid, arachic acid, ricinoleic acid, oleic acid, hydroxystearic acid, and hydroxyoleic acid.

4. The process for producing copolymers comprising admixing
   (i) an ethylene-vinylacetate copolymer containing 18% vinylacetate,
   (ii) low pressure high-density polyethylene having a molecular weight in excess of 100,000, the ratio of said ethylene-vinylacetate and said low pressure polyethylene being between 1:1 and 1:9, and
   (iii) between 0.2% and 1% by weight of the mixture of an acid component selected from the group consisting of the saturated and unsaturated carboxylic acids having at least 16 carbon atoms, the cadmium, zinc, lead, tin, barium, strontium, and calcium salts of said acids, and the saturated and unsaturated hydroxy carboxylic acids having at least 16 carbon atoms,
and rigorously working the mixture of said three components at a temperature above about 160° C. and at a pressure of about 400 atmospheres.

5. The process of claim 4 wherein said acid component contains between 16 and 26 carbon atoms and said rigorous working is carried out in a combined mixer and extruder.

6. The process of claim 5 wherein said acid component is a salt selected from the magnesium, zinc, and calcium salts of said acids.

7. The process of claim 4 wherein said acid component (iii) is selected from the group consisting of palmitic acid, stearic acid, arachic acid, ricinoleic acid, oleic acid, hydroxystearic acid, and hydroxyoleic acid.

References Cited

UNITED STATES PATENTS

| | | | |
|---|---|---|---|
| 2,462,331 | 2/1949 | Myers | 260—23 |
| 2,889,308 | 6/1959 | Fedderson | 260—23 |
| 2,655,492 | 10/1953 | Young et al. | 260—23 |
| 3,182,101 | 5/1965 | Rees | 260—885 |
| 3,201,498 | 8/1965 | Brunson et al. | 260—897 |
| 3,248,359 | 4/1966 | Maloney | 260—41 |
| 3,300,548 | 1/1967 | Baum et al. | 260—897 |

DONALD E. CZAJA, Primary Examiner

R. A. WHITE, Assistant Examiner

U.S. Cl. X.R.

260—897